(12) United States Patent
Zabawskyj

(10) Patent No.: US 7,945,254 B2
(45) Date of Patent: *May 17, 2011

(54) REAL-TIME MOBILE CONFERENCING SOLUTION

(75) Inventor: Bohdan Zabawskyj, Woodbridge (CA)

(73) Assignee: Redknee Inc., Mississauga, Ontario (CA)

( * ) Notice: Subject to any disclaimer, the term of this patent is extended or adjusted under 35 U.S.C. 154(b) by 241 days.

This patent is subject to a terminal disclaimer.

(21) Appl. No.: 12/264,154

(22) Filed: Nov. 3, 2008

(65) Prior Publication Data

US 2009/0115836 A1    May 7, 2009

Related U.S. Application Data

(63) Continuation of application No. 10/736,504, filed on Dec. 17, 2003, now Pat. No. 7,460,861.

(51) Int. Cl.
    *H04M 3/42* (2006.01)
(52) U.S. Cl. ..... 455/416; 370/261; 375/130; 348/14.08; 455/17; 455/411; 455/435.3; 455/462; 455/552.1
(58) Field of Classification Search ............... 348/14.08; 370/260, 352, 261; 379/202.01; 455/416, 455/17, 411, 435.3, 462, 552.1; 709/204, 709/227; 713/168; 375/130
See application file for complete search history.

(56) References Cited

U.S. PATENT DOCUMENTS

| | | | | |
|---|---|---|---|---|
| 4,682,367 A * | 7/1987 | Childress et al. | ............... | 455/17 |
| 5,191,593 A * | 3/1993 | McDonald et al. | ............ | 375/130 |
| 5,473,605 A * | 12/1995 | Grube et al. | .................. | 370/261 |
| 5,537,610 A * | 7/1996 | Mauger et al. | ............. | 455/435.3 |
| 5,561,840 A * | 10/1996 | Alvesalo et al. | ............... | 455/433 |
| 5,675,628 A * | 10/1997 | Hokkanen | ...................... | 455/433 |
| 5,675,629 A * | 10/1997 | Raffel et al. | ............... | 455/552.1 |
| 5,987,318 A | 11/1999 | Alperovich et al. | | |
| 6,205,338 B1 * | 3/2001 | Kim | ................. | 455/462 |
| 6,334,052 B1 * | 12/2001 | Nordstrand | ................... | 455/411 |
| 6,389,293 B1 * | 5/2002 | Clore et al. | .................. | 455/462 |
| 6,442,396 B1 * | 8/2002 | Schmidt et al. | ............... | 455/518 |
| 6,539,219 B1 * | 3/2003 | Gallant et al. | ................ | 455/416 |
| 6,611,692 B2 * | 8/2003 | Raffel et al. | ............... | 455/552.1 |
| 6,940,960 B2 * | 9/2005 | Benco et al. | ............ | 379/202.01 |
| 7,180,992 B2 * | 2/2007 | Friedrich et al. | ......... | 379/202.01 |
| 7,209,947 B1 * | 4/2007 | Lee et al. | ...................... | 709/204 |
| 7,460,861 B2 * | 12/2008 | Zabawskyj | ..................... | 455/416 |
| 7,660,298 B2 * | 2/2010 | Stanford | ...................... | 370/352 |
| 2002/0194473 A1 * | 12/2002 | Pope et al. | .................... | 713/168 |
| 2003/0043782 A1 * | 3/2003 | Laursen et al. | ................ | 370/352 |
| 2003/0185369 A1 * | 10/2003 | Oliver et al. | ............ | 379/202.01 |
| 2003/0187990 A1 * | 10/2003 | Knauerhase et al. | ......... | 709/227 |
| 2004/0170265 A1 * | 9/2004 | Benco et al. | ............ | 379/202.01 |
| 2004/0199580 A1 * | 10/2004 | Zhakov et al. | ................ | 709/204 |
| 2004/0218553 A1 * | 11/2004 | Friedrich et al. | .............. | 370/260 |
| 2009/0115836 A1 * | 5/2009 | Zabawskyj | ................ | 348/14.08 |

* cited by examiner

*Primary Examiner* — Gerald Gauthier
(74) *Attorney, Agent, or Firm* — Perry + Currier Inc.; T. Andrew Currier; Stephen J. Perry

(57) ABSTRACT

A method of conferencing communication devices in a system having (i) a conference server, (ii) a voice interface unit (VIU), and (iii) at least one conference bridge, the method including, at a first communication device: (a) establishing a first connection between the VIU and the first communication device via the switching point, the switching point enabled to establish connections for the communication devices; (b) sending first validation data from the first communication device to the VIU for forwarding to the conference server for validating the first validation data, and, in response to the validating the first validation data: (b)(i) terminating the first connection; and (b)(ii) establishing a second connection between the at least one conference bridge and said first communication device, to establish a conferencing session.

5 Claims, 1 Drawing Sheet

REAL-TIME MOBILE CONFERENCING SOLUTION

This is a continuation of U.S. patent application Ser. No. 10/736,504, filed Dec. 17, 2003 (allowed), and is generally related to U.S. patent application Ser. No. 10/307,335, filed Dec. 2, 2002, the entire contents of each of which is incorporated herein by reference.

TECHNICAL FIELD

The present invention relates generally to telecommunications network implementations for facilitating group (or peer-to-peer) communications; and in particular, to a real-time mobile conferencing solution.

SUMMARY OF THE INVENTION

The invention disclosed provides the relevant art for enabling real-time multi-media communications and conferencing events between mobile subscribers. Functionally then, the real-time mobile conferencing solution consists of a computer program product (CPP) encompassing like logical instructions, algorithms and advances to the art which enables real-time mobile conferencing, including mobile conference set-up and notification.

In one embodiment of the invention, a wireless subscriber ("client") dials a short code or a generic E. 164 national number which is dedicated for the purpose of the conference service. The telecommunication is initially terminated to a front-end server which will collect the PIN (or in other embodiments, examine the MSISDN).

In order to minimize the number of ports associated with a front-end server, the art has been innovatively articulated to support a DP3 based approach which would direct calls to a front-end IVR system which would collect the PIN (accomplished using an Establish Temporary Connection command to the SSP). Upon receiving the PIN other elements of the computer program product which helps implement the real-time mobile messaging and conference solution would direct the call to the appropriate conference server.

In alternate embodiments, a mechanism has been developed for smaller configurations (where a single server would terminate traffic and link the person to the appropriate conference bridge by virtue of the received PIN information) to 'daisy-chain' servers/cards together so that the front end DP3/IVR approach is not required. (The maximum number of ports for any given bridge would remain a function of the termination card used and other such limitations of the state of the art).

Clients activate, configure and/or otherwise manipulate a conference bridge session using any one of the following mechanisms (or a combination thereof where applicable); web-based graphical user interface (GUI), IVR menu, SMS/USSD short codes (e.g. a USSD command specifying 5 ports for 2 hours returns a PIN code for a post-paid or pre-paid client). Said mechanisms of course remain only bounded by the state of the art.

Other advancements to the art include the ability to, in the preferred embodiment, send an SMS (or e-mail) to individuals (identifiable by the MSISDN (or NAI)) that a conference bridge has been established; non-limiting details as the sponsor or originator of the conference bridge, its topic, and other such details (as PIN code) could be furnished in a like manner.

As well as the ability to outdial specific identified individuals (employing USSD command as *XX#MISDN_to_be_outdialled# for instance), which remain particularly salient and noteworthy in 'Calling Party Pays' based environments (as per the billing mechanisms in place, an incremental charge would have to be applied to the originator or sponsor).

Indeed, the CPP has been articulated, in alternate embodiments, with the necessary logic and like art to automatically pre-screen incoming participants on the basis of the MSISDN (thereby avoiding use of PIN codes). However it is appreciated that PIN codes should be used in the preferred and exemplary embodiment and in practice as an individual could well be 'double booked' on various ongoing conferences.

In other instances, the invention may be utilized in concert with prepaid vouchers to pay for ad hoc conference bridge facilities on a per-use basis; automatic debiting from credit-cards or post-paid accounts may also be interfaced as required. Additionally, in further alternate embodiments, location based notification may be co-articulated with the invention, whereby an SMS is sent to (a) pre-specified list(s) within a configurable radius of the originator or sponsor.

DETAILED DESCRIPTION OF THE PREFERRED EMBODIMENTS

Figure 1:
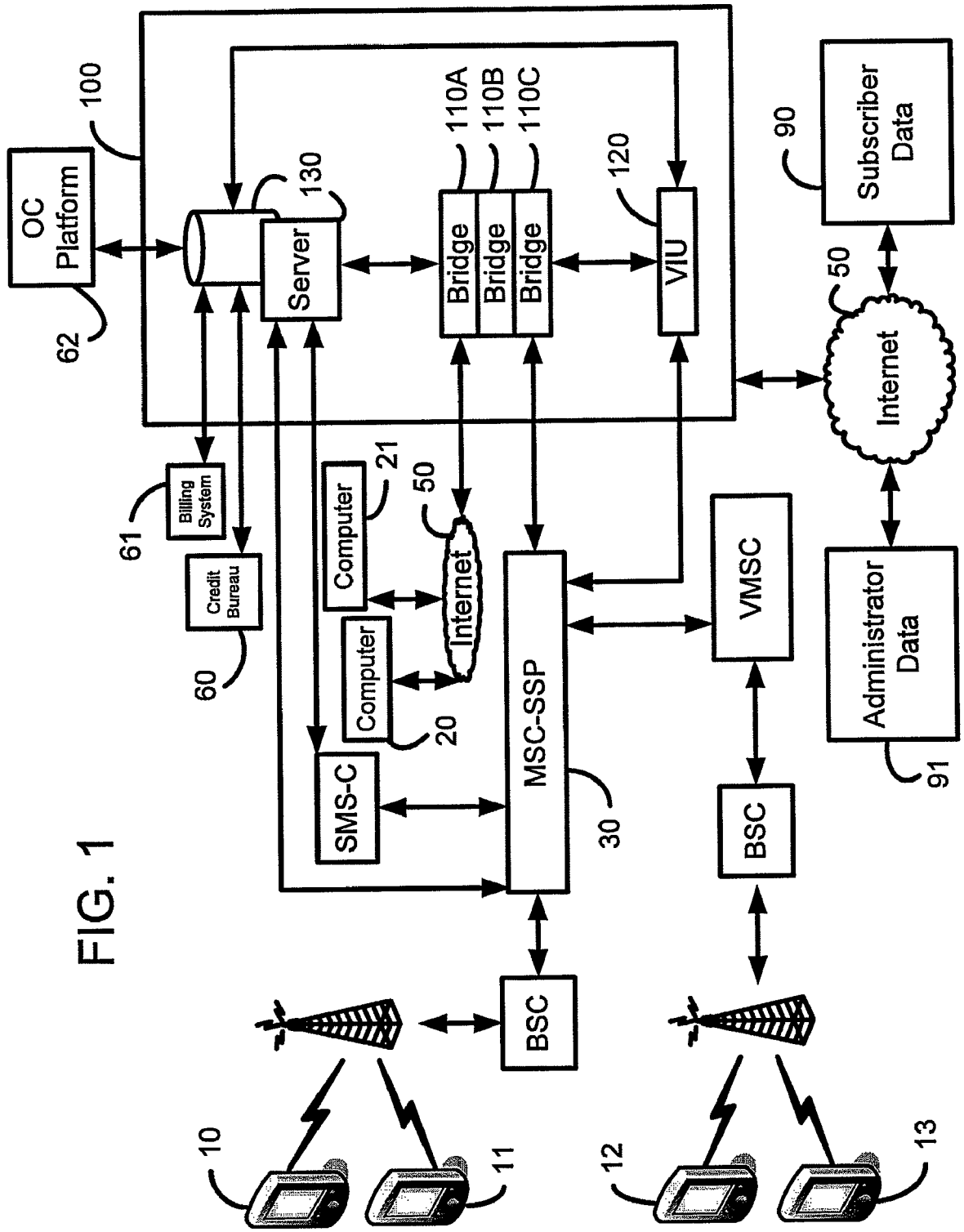
FIG. 1 illustrates a typical, non-limiting embodiment of the system level architecture employed in the disclosure of present.

Members skilled in the art will recognize that the ensuing represents an illustrative recital of the preferred embodiments of the invention of present and other embodiments may be articulated, gleaned and articulated from such while still remaining with in its spirit and scope. Indeed, equivalents found within the state of the art, and those which may reasonably and effectively be deemed equivalent in the future should also be understood as being incorporated by reference hereto and such. Furthermore, much of the language has been illustrative and is to be construed as expressly for pedagogical purposes in helping elucidate the art as concisely and beneficially as practical.

For simplicity and ease of instruction practitioners will recognize the totality of the real-time mobile conferencing solution consists of certain discrete elements of which the CPP form elements, but only when combined with other telecommunications and/or network elements does the full potency of the invention become apparent.

With reference now to FIG. 1, 130 represents the conferencing application server, which hosts the service logic and network interface modules (GSM-MAP USSD, CAMEL 2/GSM CS-1HR, SMPP, SNMP) that enable the service logic and operations (including the conference database repository) required by that particular element of the invention articulated as part of a computer program product 100 (CPP). Technicians skilled in the art will also recognize that any number of protocols, triggers and interfaces may be employed herewith, and indeed, remain only bound by the state of the art and the reference to any one protocol (or similar rules, methods and means for the transmission of data) remains purely for the purposes of simplicity and ease of instruction, and do not serve to dilute the application and scope of the invention as such. Furthermore, the conferencing application 130 has been articulated to provide certain conferencing resource management capabilities, as determining the appropriate conference bridge resources 110A, 110B, 110C (as appropriate) (including resources in use, resources reserved, resources available) for the conference call; as well as certain call handling features as, admission/authorization/rejection based on conference ID/MSISDN/PIN combination, current number of participants in the call, monitoring of call duration, and call release of each connected participant when the conference call duration time is exhausted. It 130 also allocates said resources and instructs the MSC-SSP 30 to route the user call to that resource using existing INAP/IN/CAMEL technologies. Technicians skilled in the art will also recognize that any number of protocols, triggers and interfaces may be employed herewith, and indeed, remain only bound by the state of the art and the reference to any one protocol (or similar rules, methods and means for the transmission of data) remains purely for the purposes of simplicity and ease of instruction, and do not serve to dilute the application and scope of the invention as such. The Multimedia Voice Interface Unit (MVIU) 120 provides the requisite functionality for an interactive voice server which permits prompting and collecting of information from the caller, and playing voice announcements to the conference participants. The conference bridge server 110A, 110B, 110C remains a scaleable element of the invention 100 which provides a media server(s) capable of several simultaneous, multiparty audio conferences.

Certain elements of the invention (CPP) 100 may be provisioned through an articulated graphical user interface (likely web based 50), which may permit both administrators of the elements of the invention in question 100 to provision various operating commands and parameters 90; or subscribers to the conferencing solution may well provision/schedule their own conference information (and like data) 91.

Wireless subscribers 10, 11, 12, 13 may well access the conferencing functionality of the invention 100 directly, or may distinctly or simultaneously or in parallel access said invention 100 through their internet-enabled 10 computing devices (as laptops and such) 20. In the preferred embodiment such wireless subscribers 10, 11, 12, 13 and users of computer devices 20 would already have employed and be enjoying the functionality of computer program products articulated within said handsets which permit enjoyment of the invention's 100 multi-cast server functionality as well as the local storage and/or caching of multi-media. In alternate embodiments, some conference participants may well be accessing the functionality of those elements of the invention articulated as part of a computer program product 100 through external messaging clients from their internet-enabled 50 computing devices 21.

To satisfy billing concerns and needs, certain elements of the invention articulated as part of a computer program product 100 (and 130 in particular) may interface, with credit bureaus 60 and other external billing (or voucher) systems 61. The invention 100, may in alternate embodiments, be juxtaposed and co-articulated with an Open Charging (OC) middleware platform and gateway system 10 as detailed in patent application Ser. No. 10/307,335, for mediation with a prepaid or postpaid platform (for account decrement, balance inquiry and other similar purposes). Noble technicians skilled in the art will recognize that the invention of present need not be limited to the aforementioned Open Charging (OC) middleware platform and gateway system and other similar network implementations may be employed without diluting the intent and scope as such.

Continuing with reference to FIG. 1, in the instance where a first caller 10 dials the Service Access Number (SAN) assigned to the conference call service, the MSC-SSP 30 recognizes the dialed conferencing SAN and launches a query to the invention's 100 conference application server 130. The MSC-SSP 30 is then instructed to establish a connection with the MVIU 120. Whereupon after said MSC-SSP 30 and MVIU 120 connection is established, the conferencing application 130 instructs the MVIU 120 to play a welcome announcement to the caller ("Good Morning Mr. Hunt" for instance) and prompt for the conference # and PIN. The caller 10 (in this instance) enters the conference # and PIN, the collected digits are forwarded to the conferencing application 130. Upon successful validation of the conference # and PIN, the conferencing application 130 logically instructs the MVIU 120 to play an announcement to inform the caller that he/she will be placed in the conference ("Placing Mr. Hunt in IMF conference" for instance). The conferencing application 130 instructs the MSC-SSP 30 to terminate the MVIU 120 session and connect the caller to the conference bridge server 110A, 110B or 110C (as appropriate) (conference port # information is provided). The conferencing application 130 begins monitoring the conference time and conference events (additional caller admission, caller leaving the conference call, and so forth).

Still continuing with reference to FIG. 1, in another instance a new caller 11 (in this case) wishes to join an existing conference, by dialing the SAN assigned to the conference service. The MSC-SSP 30 recognizes the dialed conferencing SAN and launches a query to the conference application server 130. The MSC-SSP 30 is instructed to establish a connection with the MVIU 120. After the MSC-SSP 30 and MVIU 120 connection is established, the elements of the invention articulated as part of a computer program product 100 which relate to the conferencing application 130 instructs the MVIU 120 to play a welcome announcement ("Good Morning" for instance) to said caller 11 and prompt for the conference # and PIN. Said caller 11 dials the conference # and PIN. The collected digits are forwarded to the conferencing application 130 for validation.

After the conference # and PIN has been successfully validated. The MVIU 120 prompts the caller 11 for his/her name ("Mr. Phelps" for instance) and informs such caller 11 that he/she will be placed in the conference. After this announcement is played the MSC-SSP 30 is instructed to terminate the session with the MVIU 120. The conferencing application 130 also instructs the MVIU 120 to set up a UI session with the conference bridge server 110A, 110B or 110C (as appropriate) (referencing other caller's 10 (already in the conference) port number) in order to announce the arrival of said caller 11. The conferencing application 130 then instructs the MSC-SSP 30 to connect the caller to the conference bridge server 110A, 110B or 110C (conference port # information is provided). The MSC-SSP 30 notifies the invention's 100 conferencing application 130 of the successful call connection of the new caller 11. (Said new caller 11, joins the existing callers to the conference 10, 12, 13 or even 20 or 21). The conferencing application 130 continues monitoring the conference time and conference events (additional caller admission, caller leaving the conference call, etc).

Also in reference to FIG. 1, in the instance where there remains imminent prospect that the conference may be terminated owing to insufficient or dwindling funds, the conferencing application 130 detects that "x minutes" (e.g. 5 minutes) of conference time is remaining, and instructs the MVIU 120 to set up a UI session with the conference bridge server 110A, 110B or 110C (as appropriate) (referencing caller 10, 12, 13 or even 20 or 21's conference port). The MVIU 120 sets the UI session with the conference bridge server 110A, 110B, or 110C (as appropriate). The conferencing application 130 requests that the MVIU 120 play a warning expiry announcement to the conference call participants 10, 11, 12, 13 and even 20 or 21 ("This conference will self-terminate in thirty (30) seconds" for instance). The MVIU 120 plays said announcement to the caller via the conference bridge server 110A, 110B, or 110C (as appropriate). After which, each conference all participant 10, 11, 12, 13 (and even 20 or 21 if articulated properly), hears said 'expiration warning' announcement.

The architecture delineated by FIG. 1, combines mobile voice network capabilities with mobile messaging (SMS, USSD, MMS among others) and Web based technologies to simplify the set up of conference calls. Furthermore, allowing for a variety of payment options (including credit-card and vouchers to facilitate casual usage of the service). The art permits flexible conference call set up. The user or 'master' provides the conference date, start time, number of participants, list of participants' MSISDNs (optional), duration, and method of payment, and certain elements of the invention articulated as part of a computer program product (CPP2) 100 returns the Conference Call Service Access Number (configurable), conference ID, and PIN (optional). User receives conference details via SMS or e-mail notification. Aside from the expected telephony user interface based conferencing scheduling (by IVR announcements) or web-based provisioning interface for the setting of conference details, the invention also permits for an SMS based conference scheduling mechanism, whereby the master may schedule a conference call by entering the required set up information in an SMS Text Message (as the art advances beyond SMS, there remains much equivalence in applying the methodology to MMS and other such iterations); as well as a USSD based conferencing scheduling, which remains similar to the SMS conference scheduling mechanism, except herewith the master enters an USSD short code command with the required set up information (e.g. time, # of participants, etc.) and upon successful conference call scheduling, the master receives the conference call information in an USSD text response as well as a SMS message.

Other innovative elements of the art include, an automated dial out feature whereby certain elements of the invention articulated as part of a computer program product 100 "automatically" initiates conference call set up by attempting to connect with selected participants' MSISDN at the scheduled time. (A configurable message is played to the terminating party). There also remains the opportunity for a manual participant dial out, whereby the master (conference chair) initiates an outdial to conference-in an individual that s/he wishes to have join the conference. (This may be associated with a configurable incremental charge). Practitioners may well appreciate that this facilitates attendance by pre-paid subscribers in calling party pay jurisdictions.

The invention may notify conference participants of the conference details (together with conference reminders set in a configurable time period) by e-mail (provided said e-mail address was entered during the conference establishment process) or by SMS (mobile users whose MSISDNs were input during the conference call set up may receive an SMS text message with the conference information and/or that the conference is scheduled to begin in x-timeframe) or by USSD, MMS and other such messaging and notification technologies as taught by the state of the art.

What is claimed is:

1. A method of conferencing communication devices in a system comprising (i) a conference server, (ii) a voice interface unit (VIU), and (iii) at least one conference bridge, comprising, at a first communication device:
   establishing a first connection between the VIU and the first communication device via a switching point, said switching point enabled to establish connections for the communication devices;
   sending first validation data from said first communication device to the VIU for forwarding to the conference server for validating the first validation data, and, in response to said validating said first validation data:
   terminating said first connection; and
   establishing a second connection between the at least one conference bridge and said first communication device, to establish a conferencing session.

2. The method of claim 1, further comprising receiving at least one announcement over said first connection for playing at said first communication device, prior to said instructing said switching point to terminate said first connection.

3. The method of claim 1, further comprising sending a conference call service access number from said first communication device to said switching point.

4. The method of claim 1, wherein said conference call set-up occurs via at least one of at least one SMS message, at least one USSD message, a web-based graphical user interface (GUI), and an interactive voice response (IVR) menu.

5. The method of claim 1, wherein said validation data comprises at least one of a conference number and PIN (personal identification number).

* * * * *